April 29, 1924.
J. KADEŘÁVEK
1,491,912
DEVICE FOR DAMPING THE MOVEMENT OF SHUTTLES IN LOOMS
Filed Sept. 29, 1922
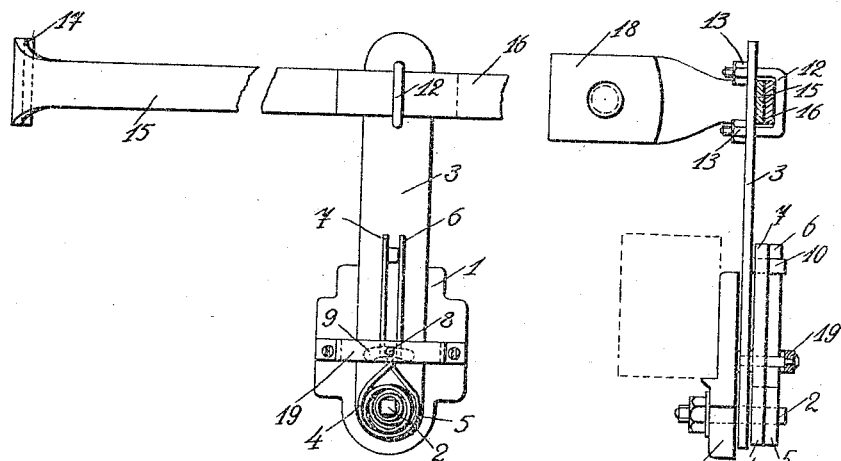
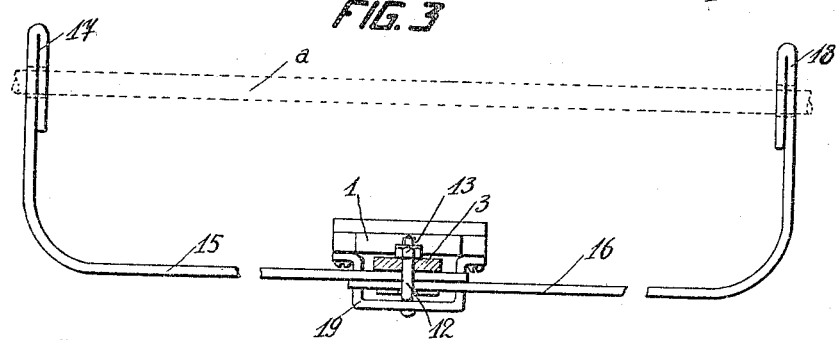
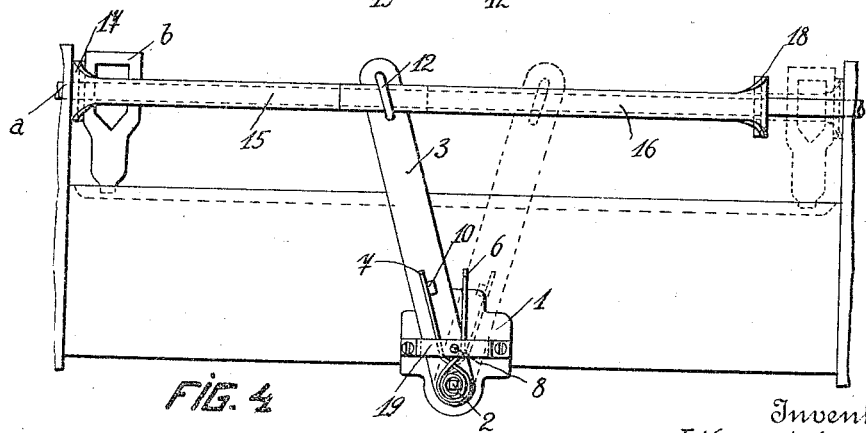

Patented Apr. 29, 1924.

1,491,912

UNITED STATES PATENT OFFICE.

JOSEF KADEŘÁVEK, OF POLICE, CZECHOSLOVAKIA.

DEVICE FOR DAMPING THE MOVEMENT OF SHUTTLES IN LOOMS.

Application filed September 29, 1922. Serial No. 591,385.

*To all whom it may concern:*

Be it known that I, JOSEF KADEŘÁVEK, citizen of the Czechoslovakian Republic, residing at Police n/Met., Czechoslovakia, have invented certain new and useful Improvements in Devices for Damping the Movement of Shuttles in Looms, of which the following is a specification.

This invention relates to devices for damping the movement of the shuttle in looms. The devices which have hitherto become known for damping the movement of the shuttle have the disadvantage that they catch the driver suddenly and their mechanism is very complicated. In comparison therewith the device according to the present invention has the advantages of simplicity of construction and a reliable, gradual braking action.

In the accompanying drawings is illustrated one example of a constructional form according to the invention.

Fig. 1 is a front elevation of the device.
Fig. 2 is a side elevation, and
Fig. 3 a plan of the same.
Fig. 4 shows the method of securing the device to the card and also shows its method of operation.

In the plate 1 is provided an arm 3 revolubly mounted on a bolt 2. The end of the bolt 2 is rectangular and carries two springs 4 and 5 of which the ends 6 and 7 straddle the pin 8 which is secured in the iron cover plate 19. On the angular movement of the arm 3 the pin 8 moves in the slot 9 so that it does not prevent the movement of the arm. The arm 3 carries a fixed pin 10 against which the end 6 of the spring 4 bears when the arm 3 moves towards the right. This spring 4 tends to draw the arm back into its mid-position. The same operation is repeated when the arm 3 moves to the left against the end 7 of the spring 5, as this spring now tends to draw the arm 3 back to its mid-position.

The arm 3 carries a bridge piece 12 provided with two screws 13, for pressing together the ends of leather belts 15 and 16 which are inserted under the bridge piece 12 in an overlapping position in such a manner that their length may be varied by the degree of overlapping which enables both the variation of the movement of the arm 3 and the adjustment of the degree of damping of the driver $b$ to be effected.

The flexible belts 15 and 16 are drawn up by means of their eyes 17 and 18 on a bar $a$ in such a manner that the driver $b$ can only run between them (Fig. 4), said driver in its alternate movement moving the device with it to one side or the other.

The method of operation of the device is as follows:—

When the shuttle enters the shuttle frame it strikes against the driver $b$ and moves it with it. The driver in turn strikes against the eye of the belt 15, thus moving the arm 3 to the left against the action of spring 5 which gradually brakes the driver $b$. The device then automatically returns to its mid-position by reason of the spring action. When the shuttle is thrown, the driver moves to the right, strikes against the eye of the belt 16, and the device swings into the dotted position in Fig. 4 and thereupon returns automatically to the mid-position. This operation is repeated.

Each frame is provided with two such devices which operate entirely independently of each other.

What I claim and desire to secure by Letters Patent is:—

1. A device for damping the movement of the shuttle in looms, said device comprising an oscillatory arm, springs restraining the oscillatory movements of said arm, a bar, and belts extending between said arm and spaced points on said bar and limiting the free movement of the driver between said points whereby the movement of the driver by the shuttle beyond said points in either direction is gradually braked.

2. A device for damping the movement of the shuttle in looms, said device comprising an oscillatory arm, springs restraining the oscillatory movements of said arm, a bar, and two belts connected together on said arm and having their free ends connected to spaced points on the bar and thereby limiting the free movement of the driver between said points, whereby the movement of the driver by the shuttle beyond said points in either direction is gradually braked.

3. A device for damping the movement of the shuttle in looms, said device comprising a pivoted oscillatory arm, springs restraining the oscillatory movements of said arm, a bar, two belts having overlapping ends adjacent the free end of the arm and having their free ends connected to spaced points on said bar and thereby limiting the free movement of the driver between said points whereby the movement of the driver by the shuttle beyond said points in either direction is gradually braked, and adjustable attaching means for the overlapping ends of the belts whereby the degree of overlap and hence the degree of braking or damping of the driver is regulatable.

In testimony whereof I have signed my name to this specification.

JOSEF KADEŘÁVEK.